US 8,817,495 B2

(12) United States Patent
Chen et al.

(10) Patent No.: US 8,817,495 B2
(45) Date of Patent: Aug. 26, 2014

(54) ULTRALOW NO-LOAD CONDUCTION LOSS DC POWER CONVERTER

(75) Inventors: Lien-Hsing Chen, Taichung (TW); Li-Hao Liu, Taichung (TW)

(73) Assignee: Power Mate Technology Co., Ltd., Taichung (TW)

( * ) Notice: Subject to any disclaimer, the term of this patent is extended or adjusted under 35 U.S.C. 154(b) by 47 days.

(21) Appl. No.: 13/104,783

(22) Filed: May 10, 2011

(65) Prior Publication Data

US 2012/0236605 A1 Sep. 20, 2012

(30) Foreign Application Priority Data

Mar. 14, 2011 (TW) .............................. 100204506 A

(51) Int. Cl.
*H02M 3/335* (2006.01)
*H02M 1/00* (2006.01)

(52) U.S. Cl.
CPC ........ *H02M 3/33592* (2013.01); *Y02B 70/1475* (2013.01); *Y02B 70/16* (2013.01); *H02M 2001/0032* (2013.01)
USPC ....................................... 363/21.14; 363/127

(58) Field of Classification Search
USPC .................. 363/21.06, 21.14, 127, 16, 21.12, 363/21.15, 21.16, 21.17, 21.18, 89, 97, 125, 363/131
See application file for complete search history.

(56) References Cited

U.S. PATENT DOCUMENTS

| 5,081,411 | A  | * | 1/1992  | Walker .......................... 323/326 |
| 6,822,882 | B1 | * | 11/2004 | Jacobs et al. ................ 363/21.06 |
| 7,443,146 | B2 |   | 10/2008 | Wei et al. |
| 7,791,903 | B2 | * | 9/2010  | Zhang et al. ..................... 363/16 |
| 7,936,575 | B2 | * | 5/2011  | Hu .............................. 363/21.06 |
| 2005/0023897 | A1 | * | 2/2005 | Anderton et al. ............. 305/202 |
| 2007/0041221 | A1 | * | 2/2007 | Phadke et al. .................. 363/16 |
| 2007/0121351 | A1 | * | 5/2007 | Zhang et al. ................ 363/21.12 |
| 2008/0175027 | A1 | * | 7/2008 | Shimada et al. ................ 363/49 |

FOREIGN PATENT DOCUMENTS

TW            M374229         2/2010

* cited by examiner

*Primary Examiner* — Gary L Laxton
*Assistant Examiner* — Alex Torres-Rivera
(74) *Attorney, Agent, or Firm* — Muncy, Geissler, Olds & Lowe P.C.

(57) ABSTRACT

An ultralow no-load conduction loss DC converter includes a DC power source, a transformer having a first winding, a first MOSET and a PWM controller at the primary side and a second winding, a third winding, a drive control unit, a rectifier unit and a second MOSFET at the secondary side. The second MOSFET, the drive control unit and the rectifier unit constitutes a combination circuit electrically coupled between one end of the second winding and one end of the third winding. The second MOSFET has set therein a body diode. The second winding and the second MOSFET forms a combination circuit electrically connected to a load. Thus, the decision to turn off the drive control unit is made at the secondary side so that non-load conduction loss can be minimized.

7 Claims, 5 Drawing Sheets

ULTRALOW NO-LOAD CONDUCTION LOSS DC POWER CONVERTER

The present Application claims priority from Taiwan Application No. 100204506, filed on Mar. 14, 2011, the entire contents of which are incorporated herein by reference.

BACKGROUND OF THE INVENTION

1. Field of the Invention

The present invention relates to power conversion technology and more particularly, to an ultralow no-load conduction loss DC power converter.

2. Description of the Related Art

During power conversion of a conventional DC-DC converter, power loss is inevitable. This power loss lowers the conversion efficiency.

However, power density requirement for DC-DC converter is getting critical. The most popularly accepted method to enhance the conversion efficiency of a DC-DC converter is the use of a power MOSFET at the secondary side as a synchronous rectification switch device. This method effectively enhances the efficiency during high load. However, due to increased power loss during driving, this method cannot eliminate no-load power loss, resulting in low efficiency at no-load.

U.S. Pat. No. 7,443,146 discloses DC-DC converter entitled "Auxiliary turn-on mechanism for reducing conduction loss in body-diode of low side MOSFET of coupled-inductor DC-DC converter". This design has the aforesaid drawback of no-load conduction loss.

Taiwan Patent M374229, issued to the present inventor, discloses a technique that reduces no-load conduction loss. However, this design is based on current detection at the primary side of the transformer. It does not involve the technique for making a decision at the secondary side to reduce standby loss without through the primary side. This prior art design is functional to reduce no-load conduction loss, however, there is still room for improvement.

SUMMARY OF THE INVENTION

The present invention has been accomplished under the circumstances in view. It is the main object of the present invention to an ultralow no-load conduction loss DC converter, which allows the decision to turn off the drive control unit to be made at the secondary side so that non-load conduction loss can be minimized.

To achieve this and other objects of the present invention, an ultralow no-load conduction loss DC converter comprises a DC power source having a positive terminal and a negative terminal and a transformer having a primary side and a secondary side. The primary side comprises a first winding, a first MOSET and a PWM controller. The first winding has one end thereof electrically connected to the positive terminal of the DC power source and an opposite end thereof electrically connected to the first MOSFET. The first MOSFET is electrically connected to the PWM controller. The PWM controller has the function of entering a burst mode, a pulse skipping mode or an off-time modulation mode at low load. The secondary side comprises a second winding, a third winding, a drive control unit, a rectifier unit and a second MOSFET. The rectifier unit is electrically connected to the drive control unit. The drive control unit is electrically connected to the second MOSFET. The second MOSFET, the drive control unit and the rectifier unit constitute a combination circuit electrically coupled between one end of the second winding and one end of the third winding. The second MOSFET comprises therein a body diode. The second winding and the second MOSFET forms a combination circuit electrically connected to a load. Thus, the decision to turn off the drive control unit is made at the secondary side to further turn off the second MOSFET, enabling the body diode of the second MOSFET to rectify the current, and therefore non-load conduction loss can be minimized.

DETAILED DESCRIPTION OF THE INVENTION

Figure 1:
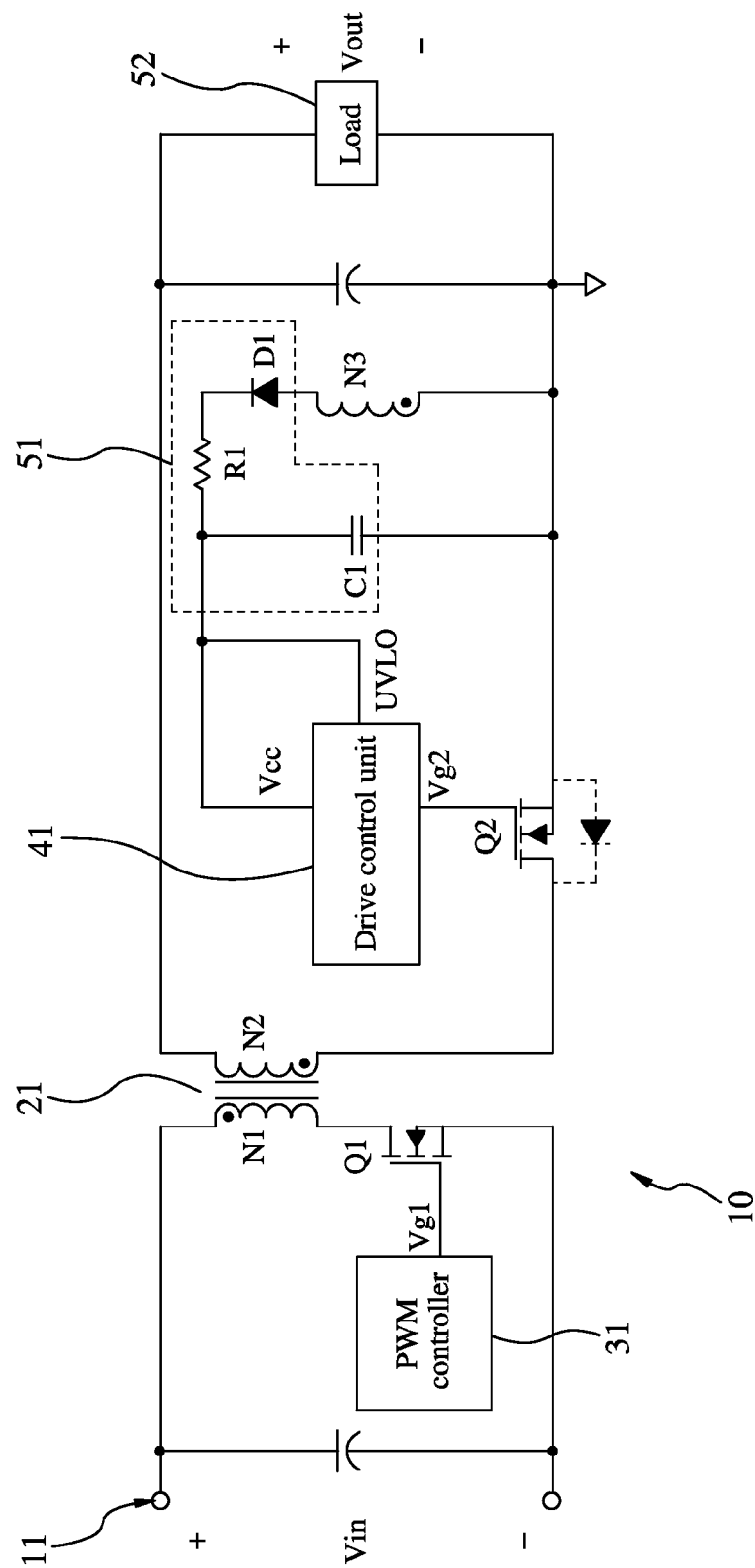
FIG. 1 is a circuit diagram of an ultralow no-load conduction loss DC converter in accordance with a first embodiment of the present invention.
Figure 2:
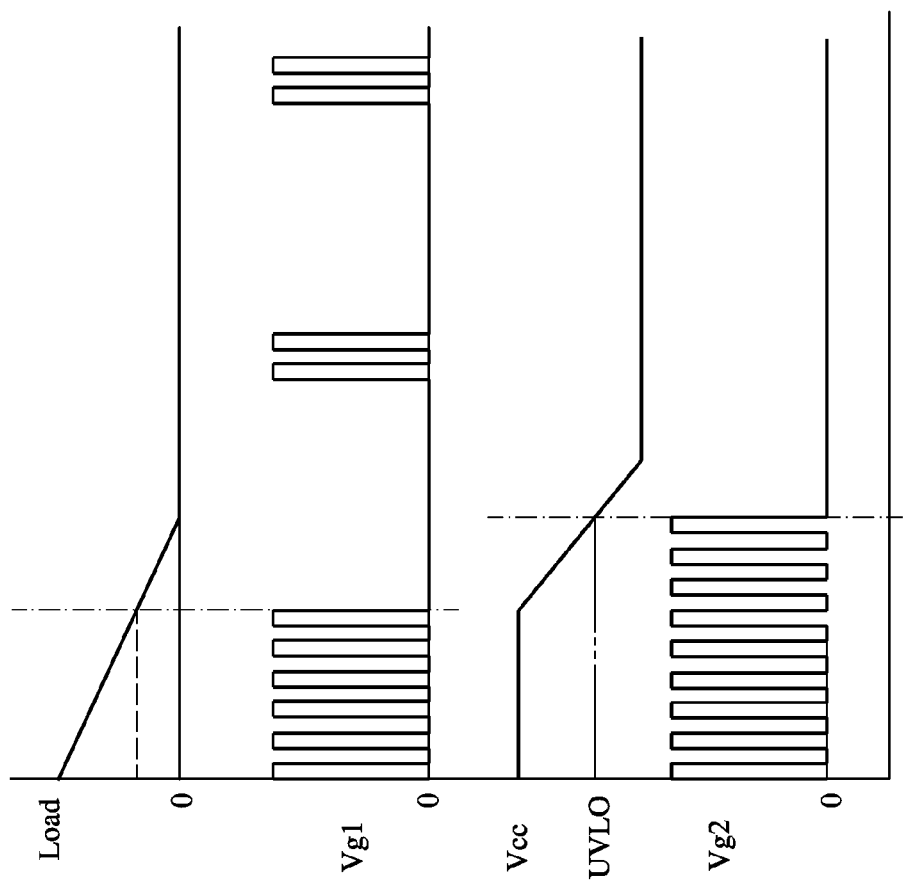
FIG. 2 is a waveform diagram of the first embodiment of the present invention, illustrating the waveform outputted by the PWM controller in the burst mode and the waveform outputted by the drive control unit.

Referring to FIGS. 1 and 2, an ultralow no-load conduction loss DC converter 10 in accordance with a first embodiment of the present invention generally is shown comprising a DC power source 11, a transformer 21, a first MOSFET (metal-oxide semiconductor field-effect transistor) Q1, a PWM (pulse-width modulation) controller 31, a drive control unit 41, a rectifier unit 51 and a second MOSFET (metal-oxide semiconductor field-effect transistor) Q2.

The DC power source 11 comprises a positive terminal and a negative terminal.

The transformer 21 comprises a primary side and a secondary side.

The primary side of the transformer 21 comprises a first winding N1 that has its one end connected to the positive terminal of the DC power source 11 and its other end connected to the first MOSFET Q1. The first MOSFET Q1 has is gate electrically connected to the pin Vg1 of the PWM controller 31. The PWM controller 31 has the function of entering a burst mode, a pulse skipping mode or an off-time modulation mode at low load.

The secondary side of the transformer 21 comprises a second winding N2 and a third winding N3. The drive control unit 41 and the rectifier unit 51 are provided at the secondary side of the transformer 21. The rectifier unit 51 is electrically connected to the drive control unit 41. The drive control unit 41 has the pin Vg2 thereof electrically connected to the gate of the second MOSFET Q2. The combination circuit of the second MOSFET Q2, the drive control unit 41 and the rectifier unit 51 is electrically coupled between one end of the second winding N2 and one end of the third winding N3. Further, the second MOSFET Q2 comprises therein a body diode. According this embodiment, the drive control unit 41 is a synchronous rectifier controller having a UVLO (under voltage lock out) pin electrically connected to the rectifier unit 51. The rectifier unit 51 consists of a diode D1, a resistor R1 and a capacitor C1.

The combination circuit of the second winding N2 and the second MOSFET Q2 is electrically connected to a load 52.

The operation of this first embodiment is outlined hereinafter.

By means of the pin Vg1 of the PWM controller 31 to control conduction of the first MOSFET Q1, power supply from the primary side is transformed to the secondary side.

During the normal operation (or high load mode), the rectifier unit 51 rectifies the output power supply of the third winding N3, and then inputs the rectified power supply into the drive control unit 41. At this time, the drive control unit 41 determines the status to be a normal operation status, and then outputs a drive pulse to turn on the second MOSFET Q2 for normal operation.

When entering the no-load mode where the load 52 is lowered to the level of the burst mode of the PWM controller 31, the voltage level of the output voltage Vcc of the rectifier unit 51 is lowered due to rectification of the power supply generated by the third winding N3 by the diode D1 of the rectifier unit 51 and the charge and charging time constant relationship between the resistor R1 and capacitor C1 of the rectifier unit 51. When the voltage level f the output voltage Vcc of the rectifier unit 51 drops below the voltage level of the pin UVLO, the pin Vg2 of the drive control unit 41 stops outputting the drive pulse, and at this time, the second MOSFET Q2 is off, enabling its body diode to rectify the current. At this time, no power is consumed to drive the second MOSFET Q2, i.e., driving energy loss is eliminated, and therefore non-load conduction loss is minimized.

FIG. 2 illustrates the waveform outputted by the PWM controller 31 in the burst mode and the waveform outputted by the drive control unit 41. As illustrated, when the PWM controller 31 enters the burst mode, the output pulse of the pin Vg1 shows a transmittance variation. After the drive control unit 41 is off, the pin Vg2 stops outputting the pulse, and therefore the second MOSFET Q2 is off.

In the aforesaid first embodiment, the decision to turn off the drive control unit 41 is made subject to the output voltage level of the rectifier unit 51, and therefore the decision is made at the secondary side of the transformer 21.

Further, because the PWM controller 31 enters the burst mode at no-load and the body diode of the second MOSFET Q2 at the secondary side is used to rectify the current, the ultralow no-load conduction loss DC converter 10 can reduce conduction loss much better than the prior art technique.

Figure 3:
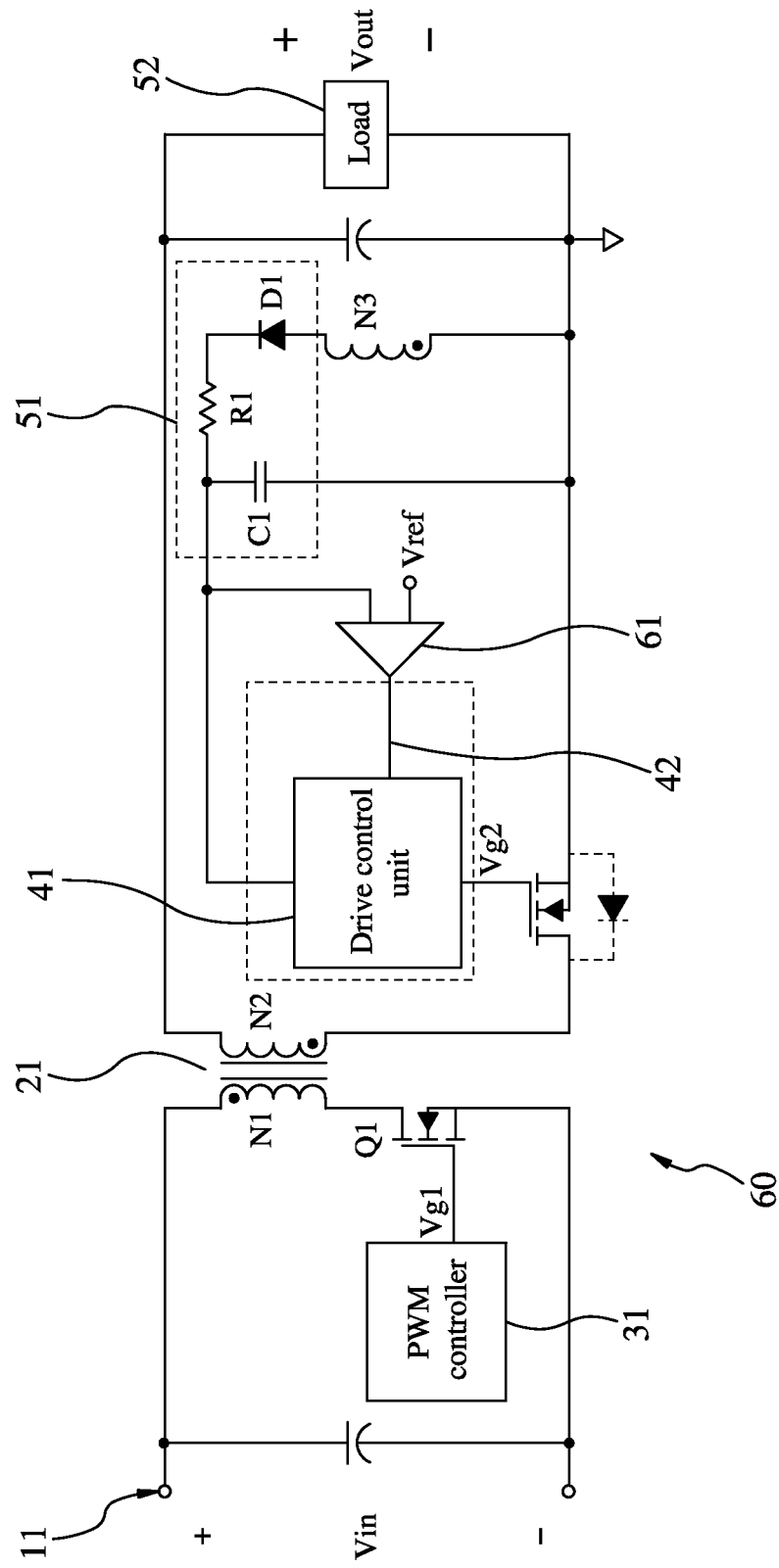
FIG. 3 is a circuit diagram of an ultralow no-load conduction loss DC converter in accordance with a second embodiment of the present invention.

FIG. 3 illustrates an ultralow no-load conduction loss DC converter 60 in accordance with a second embodiment of the present invention. This second embodiment is substantially similar to the aforesaid first embodiment with the exception of the following features.

This second embodiment further comprises a comparator 61. Further, the drive control unit 41 of this second embodiment further comprises a disable pin 42.

The comparator 61 has its input end electrically connected to the rectifier unit 51, and its output end electrically connected to the disable pin 42 of the drive control unit 41.

When compared to the aforesaid first embodiment of the present invention, the operation of this second embodiment is characterized in that: when the voltage level of the secondary side drops below the level of the reference voltage Vref of the comparator 61, the comparator 61 stops outputting the drive pulse, thus the second MOSFET Q2 is off, enabling its body diode to rectify the current. Therefore, this second embodiment has the same effect of low non-load conduction loss.

Figure 4:
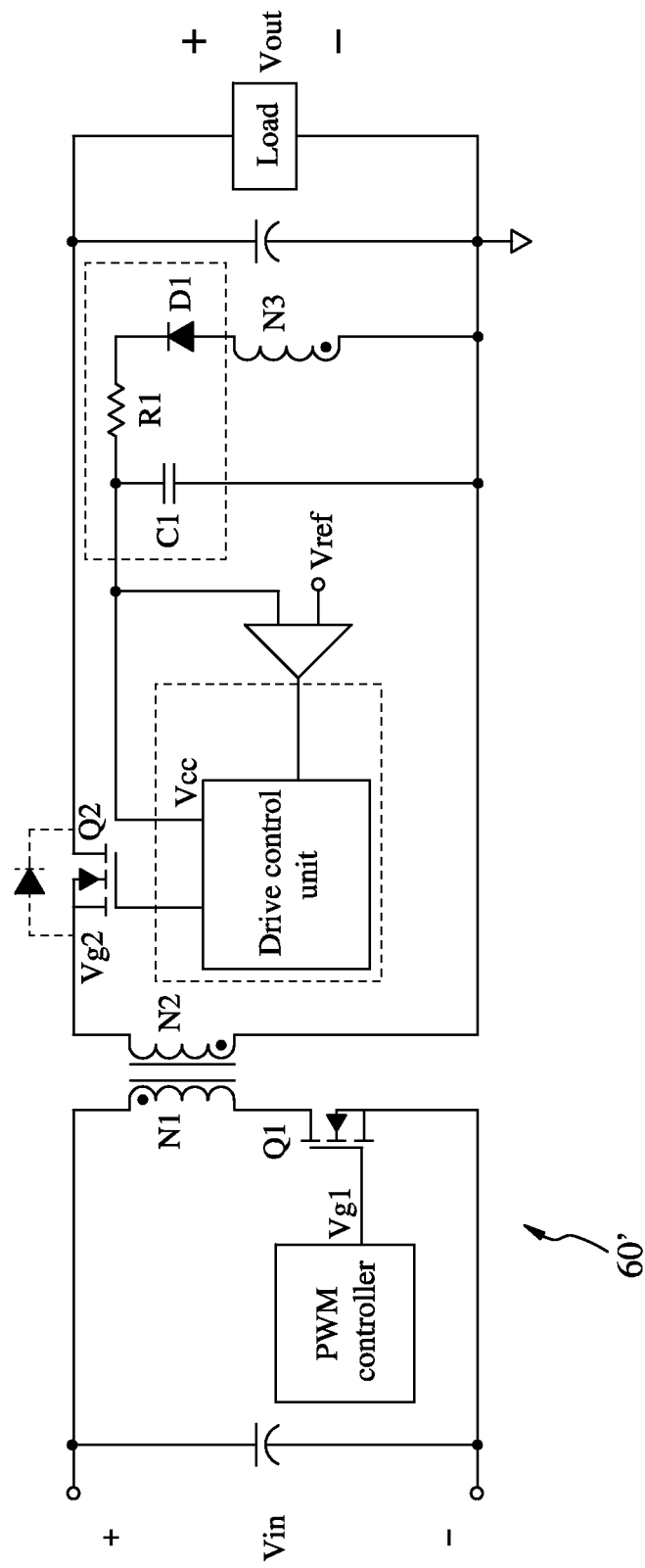
FIG. 4 is a circuit diagram of an alternate form of the ultralow no-load conduction loss DC converter in accordance with the second embodiment of the present invention, illustrating the second MOSFET arranged at a different location.

It is to be understood the arrangement of the second MOSFET Q2 at the low end of the second winding N2 shown in FIG. 3 is not a limitation. In an alternate form of the second embodiment of the present invention, as shown in FIG. 4, the second MOSFET Q2 of the ultralow no-load conduction loss DC converter 60' is arranged at the high end of the second winding N2, achieving the same effect.

The other structural details, operation method and effects of this second embodiment are same as the aforesaid first embodiment, and therefore no further detailed description is necessary.

Figure 5:
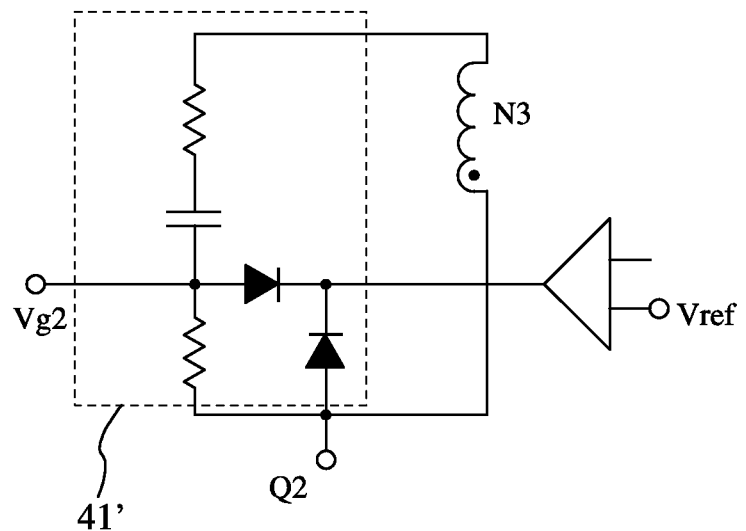
FIG. 5 is a circuit diagram of an alternate form of the drive control unit in accordance with the present invention.

Further, it is to be understood that, instead of the use of a synchronous rectifier controller for the drive control unit 41, an equivalent device can be selectively used. For example, the drive control unit 41' shown in FIG. 5 is formed of two diodes, two resistors and one capacitor, achieving the same effect.

Figure 6:
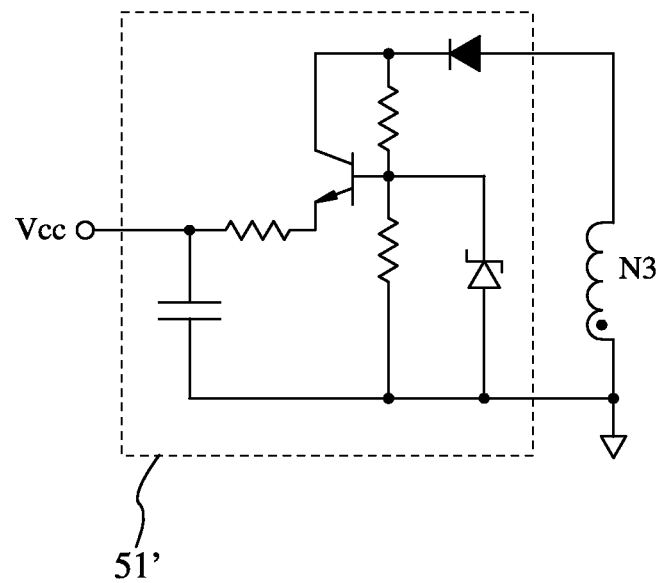
FIG. 6 is a circuit diagram of an alternate form of the rectifier unit.

Further, the rectifier unit 51 of the aforesaid second embodiment is formed of two diodes, one resistor and one capacitor. Alternatively, the rectifier unit 51' shown in FIG. 6 is formed of one transistor, a plurality of resistors, one diode, one Zener diode and one capacitor, achieving the same effect as the rectifier unit 51 of the aforesaid second embodiment.

As stated above, the decision to turn off the drive control unit 41 is made at the secondary side to further turn off the second MOSFET Q2, enabling the body diode of the second MOSFET Q2 to rectify the current, and therefore non-load conduction loss can be minimized.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An ultralow no-load conduction loss DC converter, comprising:

a DC power source comprising a positive terminal and a negative terminal; and a transformer comprising a first winding, a second winding and a third winding, the first winding provided on a primary side of the transformer and the second winding and the third winding provided on a secondary side of the transformer, said first winding having one end thereof electrically connected to the positive terminal of said DC power source and an opposite end thereof electrically connected to a first MOSFET, said first MOSFET being electrically connected to said PWM controller, said PWM controller having the function of entering one of a burst mode, a pulse skipping mode and an off-time modulation mode at low load; and a drive control unit and a rectifier unit configured to output an output voltage, which are electrically connected with each other, the drive control unit being electrically connected with a second MOSFET, said second MOSFET, said drive control unit and said rectifier unit constituting a combination circuit electrically coupled between one end of said second winding and one end of said third winding, and said second MOSFET is directly electrically coupled between said second winding and said third winding, said second MOSFET comprising therein a body diode, said second winding and said second MOSFET forming a combination circuit electrically connected to a load;

wherein said output voltage is less than a predetermined voltage to turn off said drive control unit and further turn off said second MOSFET when said DC converter is operated in the no-load condition.

2. The ultralow no-load conduction loss DC converter as claimed in claim 1, further comprising a comparator having an input end thereof electrically connected to said rectifier unit and an output end thereof electrically connected to said drive control unit.

3. The ultralow no-load conduction loss DC converter as claimed in claim 1, wherein said first MOSFET has the gate thereof electrically connected to said PWM controller; said second MOSFET has the gate thereof electrically connected to said drive control unit.

4. The ultralow no-load conduction loss DC converter as claimed in claim 1, wherein said drive control unit is a synchronous rectifier controller having an under voltage lock out pin electrically connected to said rectifier unit.

5. The ultralow no-load conduction loss DC converter as claimed in claim 1, wherein said drive control unit is formed of two diodes, two resistors and one capacitor.

6. The ultralow no-load conduction loss DC converter as claimed in claim 1, wherein said rectifier unit is formed of one diode, one resistor and one capacitor.

7. The ultralow no-load conduction loss DC converter as claimed in claim 1, wherein said rectifier unit is formed of one transistor, a plurality of resistors, one diode, one Zener diode and one capacitor.

\* \* \* \* \*